Patented Feb. 11, 1941

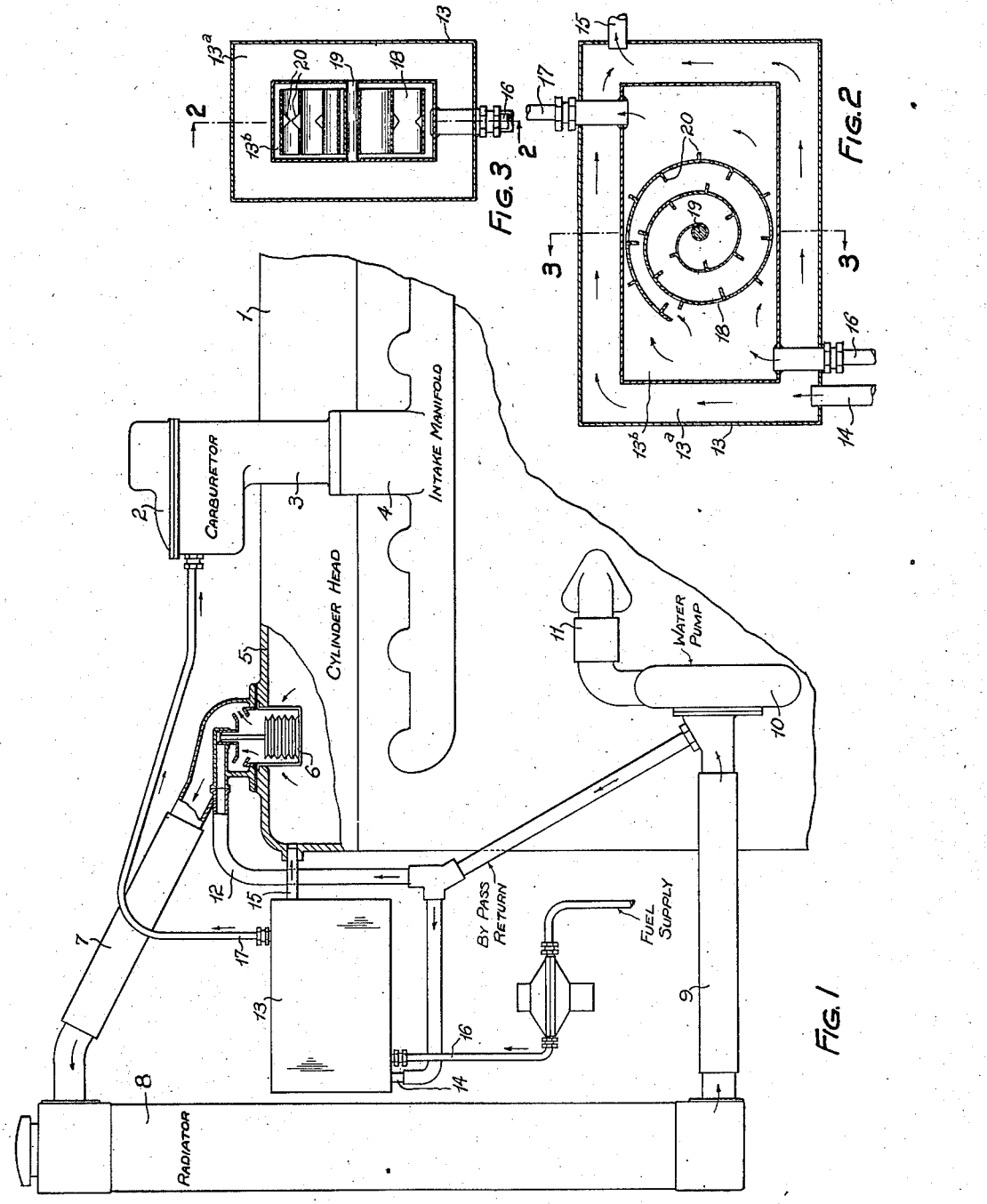

2,231,525

UNITED STATES PATENT OFFICE 2,231,525

MODIFICATION OF A HYDROCARBON FUEL IN AN INTERNAL COMBUSTION ENGINE

Adolf Breitling, Cleveland, Ohio

Application July 8, 1938, Serial No. 218,176

6 Claims. (Cl. 123—122)

My invention pertains to a modification of a liquid hydrocarbon fuel whereby to improve its combustible property, whether used in an internal combustion engine or for other uses of distillates as a fuel, such as in oil burning appliances like furnaces. Moreover, I believe I have conceived a new process for modifying a liquid hydrocarbon fuel and also a new combination of co-operating features or elements in an internal combustion engine.

I am not unaware that the past few decades have shown a long series of efforts to adapt the various distillates or heavy hydrocarbon fuels to commercially satisfactory use in internal combustion engines of the two or four cycle types and which depend upon flame ignition. Perhaps laboratory success has been achieved or enduring success supposed, but so far as my knowledge extends no proposal for the use in an internal combustion engine (not of the Diesel or fuel injection type) of heavy hydrocarbons has remained on the automobile market in any country, because none has been proven a continuing success.

Figure 1 is a diagrammatic, partially broken view showing an internal combustion engine hook-up embodying my invention.

Figure 2 is mainly an enlarged vertical cross section to illustrate the interior of the featuring construction of my invention.

Figure 3 is a section on line 3—3 of Figure 2.

An engine case 1 carries a carburetor 2 connected at 3 with an intake manifold 4. The engine case 1 comprises a conventional enveloping water jacket 5 having a thermostatically operated valve connection at 6 having a connection 7 leading to the top of a radiator 8 from the lower end of which there is a connection 9 leading to a water pump 10 which is connected at 11 with the water jacket of the engine. The function of the thermostatic valve 6 is to cut off circulation through the connection 7 and down through the radiator until the water shall have reached a predetermined adequate temperature whereby regulation of the temperature of the water is had. A by-pass connection 12 is also established between the pump and has two branches, one connected at the valve opening 6 and the other connected with a double walled box 13 at 14. The water outlet 15 from the box connects with the engine jacket as shown in Figure 1.

Located within the box 13, but in spaced relation thereto as indicated by 13a, is another box 13b having its bottom connected at one end with the fuel connection 16 leading from the fuel supply and having its top connected at the other end with the fuel connection 17 leading to the carburetor. Positioned within the inner box 13b is a coiled strip of copper to be held in place in any suitable manner as by mounting it on a pin 19. The copper strip or ribbon is fashioned with a plurality of struck-out tongues 20 to provide a corresponding number of apertures therein.

While my inventions are believed to be improving even when using lighter hydrocarbons, such as gasoline, my primary object has been to make possible a lastingly satisfactory performance with heavy hydrocarbon fuel.

My inventions involve the simple discovery of the beneficial results to be realized by the introduction of pure copper into a heated fuel conduit. The heated fuel conduit containing copper has its outlet end in communication with the carburetor. The form in which the copper is introduced may vary. I have employed plain copper sheets and perforated copper sheets of various shape and also copper sheets variously roughened.

I admit that I have not been able to determine any scientific explanation of the phenomenon of the improved results attending the use of a hydrocarbon fuel exposed to copper in some form in the presence of heat.

Whether there occurs merely a physical modification of the fuel or a chemical conversion thereof I cannot confidently state. However, I have demonstrated that better combustion may be realized without excessive crankcase dilution and without undue loss of power by causing the fuel to flow, while on its way to the atomizing jet, through a heated copper-containing conduit.

In actual practice I have introduced an irregularly shaped sheet of perforated copper into that section of a fuel conduit having an outlet directly connecting with the carburetor while maintaining such section of the conduit adequately heated to a temperature ranging between one hundred forty degrees (140° F.) and two hundred twelve degrees (212° F.). After operation of the engine for a considerable length of time a fine black deposit was seen to have accumulated on the copper sheet, but whether that was to be rightly thought of as the result of corrosion or the extraction and retention of some element like carbon from the fuel—I do not know.

When using my invention as an aid to combustion of hydrocarbon fuel in furnaces, steam boilers or other heating appliances, the formation of coke or carbon on or around the burner becomes greatly reduced or entirely eliminated or deposition of carbon in the flues or around the heated vessel also reduced in some cases to the point where cleaning becomes unnecessary except at long intervals. The more complete combustion is further evidenced by blue flame replacing a yellow one and by the fact less oil is used to produce a given amount of heat.

I claim:

1. In the art of preparing hydrocarbon fuels of a boiling point higher than that of commercial gasoline for use in atomized condition, the steps of supplying the fuel to a line leading to the atomizer, heating the fuel in direct contact with copper, and maintaining the heating temperature at a point which will render the fuel appreciably hot but not above the boiling point of water.

2. A process in accordance with claim 1 in which the heating temperature is maintained between substantially 140° F. and 212° F.

3. A process in accordance with claim 1 in which the fuel is heated while traveling to the atomizer.

4. A process in accordance with claim 1 in which the fuel is indirectly heated.

5. In the art of preparing hydrocarbon fuels of a boiling point higher than that of commercial gasoline for use in atomized condition, the steps of supplying the fuel to a line leading to the atomizer, heating the fuel in contact with an agent which includes copper, and maintaining the heating temperature at a point which will render the fuel appreciably hot but not above the boiling point of water.

6. A process according to claim 5 in which the heating takes place in the line.

ADOLF BREITLING.